United States Patent
Seiter et al.

(10) Patent No.: US 9,783,169 B2
(45) Date of Patent: Oct. 10, 2017

(54) METHOD FOR ASSISTING A DRIVER OF A MOTOR VEHICLE

(75) Inventors: Michael Seiter, Eberdingen-Hochdorf (DE); Florian Raisch, Gaertringen (DE)

(73) Assignee: ROBERT BOSCH GMBH, Stuttgart (DE)

(*) Notice: Subject to any disclaimer, the term of this patent is extended or adjusted under 35 U.S.C. 154(b) by 841 days.

(21) Appl. No.: 13/177,277

(22) Filed: Jul. 6, 2011

(65) Prior Publication Data

US 2012/0173068 A1   Jul. 5, 2012

(30) Foreign Application Priority Data

Jul. 7, 2010   (DE) .................... 10 2010 031 038

(51) Int. Cl.
| | | |
|---|---|---|
| *B60T 7/22* | (2006.01) | |
| *B60W 30/06* | (2006.01) | |
| *B60W 30/095* | (2012.01) | |
| *B60W 30/16* | (2012.01) | |
| *B60W 50/16* | (2012.01) | |
| *B60W 10/184* | (2012.01) | |

(52) U.S. Cl.
CPC ............... *B60T 7/22* (2013.01); *B60W 30/06* (2013.01); *B60W 30/0953* (2013.01); *B60W 30/16* (2013.01); *B60W 50/16* (2013.01); *B60T 2201/02* (2013.01); *B60T 2201/022* (2013.01); *B60T 2201/10* (2013.01); *B60W 10/184* (2013.01); *B60W 2550/10* (2013.01); *B60W 2550/30* (2013.01); *B60W 2550/308* (2013.01); *B60W 2720/106* (2013.01)

(58) Field of Classification Search
CPC ......... B60T 7/22; B60W 50/14; B60W 50/16; B60W 30/08–30/09; B60W 30/085
USPC ................................. 7/23; 701/23
See application file for complete search history.

(56) References Cited

U.S. PATENT DOCUMENTS

| | | | |
|---|---|---|---|
| 5,574,644 A * | 11/1996 | Butsuen et al. ................. 701/93 |
| 6,226,389 B1 * | 5/2001 | Lemelson et al. ............ 382/104 |
| 6,275,772 B1 * | 8/2001 | Sugimoto et al. ............ 701/301 |
| 6,583,403 B1 * | 6/2003 | Koike et al. ................... 250/221 |
| 6,871,145 B2 * | 3/2005 | Altan et al. ..................... 701/301 |
| 2004/0049343 A1 * | 3/2004 | Yamadaji et al. ............ 701/301 |
| 2004/0155811 A1 * | 8/2004 | Albero et al. ................... 342/70 |
| 2005/0168328 A1 * | 8/2005 | Kitterer et al. ................ 340/435 |
| 2005/0259033 A1 * | 11/2005 | Levine ............................... 345/7 |
| 2006/0097570 A1 * | 5/2006 | Doerr et al. .................... 303/193 |
| 2006/0100783 A1 * | 5/2006 | Haberer et al. ................ 701/301 |
| 2006/0163943 A1 * | 7/2006 | Von Holt et al. ............. 303/177 |
| 2007/0030157 A1 * | 2/2007 | Park ............................... 340/576 |
| 2007/0179697 A1 | 8/2007 | Holler |
| 2007/0299610 A1 * | 12/2007 | Ewerhart et al. ............. 701/301 |
| 2008/0100428 A1 * | 5/2008 | Price ............................... 340/435 |
| 2008/0272898 A1 * | 11/2008 | Irion et al. ..................... 340/436 |
| 2008/0309468 A1 * | 12/2008 | Greene et al. ................ 340/436 |
| 2008/0312832 A1 * | 12/2008 | Greene et al. ................ 701/301 |
| 2009/0037055 A1 * | 2/2009 | Danner et al. .................. 701/45 |
| 2009/0128318 A1 * | 5/2009 | Nagata et al. ................. 340/467 |
| 2009/0143951 A1 * | 6/2009 | Takahashi et al. ............ 701/70 |
| 2010/0114490 A1 * | 5/2010 | Becker .......................... 701/301 |
| 2011/0313665 A1 * | 12/2011 | Lueke et al. .................. 701/301 |
| 2012/0173068 A1 * | 7/2012 | Seiter et al. .................... 701/23 |
| 2013/0184925 A1 * | 7/2013 | Niemz et al. ................... 701/25 |
| 2013/0282268 A1 * | 10/2013 | Goerick et al. .............. 701/301 |

FOREIGN PATENT DOCUMENTS

| | | |
|---|---|---|
| DE | 19845568 | 10/1999 |
| DE | 102 37 714 | 2/2004 |
| DE | 10258617 | 4/2004 |
| DE | 10347980 A1 | 3/2005 |
| DE | 102004041225 | 3/2006 |
| DE | 102005043077 | 3/2007 |
| DE | 102008006309 | 2/2009 |
| DE | 102007060862 A1 | 7/2009 |
| DE | 102008018474 | 11/2009 |

* cited by examiner

*Primary Examiner* — Krishnan Ramesh
(74) *Attorney, Agent, or Firm* — Norton Rose Fulbright US LLP; Gerard Messina

(57) ABSTRACT

In a method for assisting a driver of a motor vehicle in a driving maneuver, the surroundings of the vehicle are recorded, and it is checked whether at least one object is located in the surroundings of the vehicle, and it is ascertained subsequently whether the vehicle is approaching the object, and a warning to the driver is output if the vehicle approaches the object up to a critical distance. The driver is warned by a warning jerk, and after the warning jerk has taken place, the speed of the vehicle is automatically reduced.

19 Claims, No Drawings

METHOD FOR ASSISTING A DRIVER OF A MOTOR VEHICLE

CROSS-REFERENCE TO RELATED APPLICATIONS

The present application claims priority to Application No. 10 2010 031 038.7, filed in the Federal Republic of Germany on Jul. 7, 2010, which is expressly incorporated herein in its entirety by reference thereto.

FIELD OF THE INVENTION

The present invention relates to a method for assisting the driver of a motor vehicle during a parking process. The present invention also relates to a device for carrying out the method.

BACKGROUND INFORMATION

Methods for assisting a driver of a motor vehicle are used, for example, to assist the driver during a parking process. It is also possible to assist the driver in maneuvering or in driving along narrow streets or dirt roads. To carry out this method, driver assistance systems are generally used, such as parking assistance systems.

Besides driver assistance systems that are used at low speeds, driver assistance systems are also known which assist the driver during driving at higher speeds. These include, for instance, lane-holding assistants or distance regulation from a preceding vehicle.

All driver assistance systems have in common that the surroundings of the vehicle have to be monitored. Distance sensors are usually used for this, which require different operating ranges, depending on the function for which they are being used. With the aid of distance sensors, for instance, objects that the vehicle is approaching are able to be detected.

In order to avoid a collision with an object when the vehicle is approaching the object, it is known, for example, from German Patent Document No. 102 37 714, that one may initiate an emergency braking process at a suitable time, when approaching an object, in order to avoid a collision with the object. Such an emergency braking process is particularly required if the vehicle is approaching the object at a speed that is too great for the distance from the object, and if there is the danger of a collision with the object in response to slow braking or even if the speed remains the same. In order not to initiate an emergency braking process suddenly, but to warn the driver of the vehicle first, it is known from German Patent Document No. 102 37 714 that one may carry out a warning braking process before the actual emergency braking process, which directs the driver's attention to the dangerous situation. By the use of the warning braking process, the driver is given the opportunity to get set for the dangerous situation and to prepare for a possible evasive maneuver. However, the disadvantage of this method is that the driver is warned only a very short time before the initiation of an emergency braking process, so that the driver is hardly given an opportunity of taking an action himself. He is only still able to react to the measures carried out by the driver assistance system.

DETAILED DESCRIPTION

The method according to example embodiments of the present invention, for assisting the driver of a motor vehicle in a driving process, includes the following steps:

(a) recording the surroundings of the vehicle and checking whether at least one object is located in the surroundings of the vehicle,
(b) ascertaining whether the vehicle is approaching the object, and outputting a warning to the driver when the vehicle approaches the object up to a critical distance.

According to example embodiments of the present invention, the driver is warned by a warning jerk, and after the warning jerk has taken place, the speed of the vehicle is automatically reduced.

By the warning jerk, the driver becomes informed about an imminent danger situation. By contrast to optical indications or acoustical indications, such as LED's or signal tones, which may be easily overlooked by an unattentive driver, the attention of the driver is immediately aroused by the warning jerk.

The reduction in speed, after the jerk is performed, has the advantage that the driver is allotted a longer time to react to the warning jerk, and to take over himself the guidance of the vehicle. A further advantage is that, first of all, a slower change in speed takes place so that, for example, the drivers of the vehicles following the vehicle are given sufficient opportunity to react to the reduction in speed, and so that there is not the danger, based on the suddenly occurring emergency braking process, that a subsequent driver does not react fast enough, and does not stop his vehicle in time.

Any type of sensor may be used to record the surroundings of the vehicle. The ones usually used are distance sensors, such as are already being used for driver assistance systems. Such distance sensors are ultrasonic sensors, infrared sensors, radar sensors, LIDAR sensors or even cameras. The sensors are preferably situated all the way around the vehicle, that is, in the front section and in the rear section of the vehicle, as well as on the side of the vehicle, so as to record the surroundings of the vehicle, in particular.

If the method is used at higher speeds, for instance, in so-called ACC systems (adaptive cruise control), which regulate the distance from preceding objects and carry out distance control, appropriate sensors are required that have a sufficiently large operating range. For this, radar sensors or LIDAR sensors are used, in particular. Cameras having a sufficient operating range may also be used. The use of radar sensors is preferred.

If the system is to be used at low speeds, for instance, in parking or in the assistance of driving maneuvering on narrow roads, and the speeds are lower, it is also possible, for example, to record the surroundings using ultrasonic sensors, cameras or infrared sensors, for example.

One is able to determine the distance from objects in the surroundings of the vehicle from the data of the distance sensors. For this purpose, in a system not based on a camera, a signal is sent by the sensor and an echo reflected by the object is received. From the propagation time of the signal, the distance from the object is ascertained. In camera-based systems, it is detected, using image processing, whether there are objects in the surroundings of the vehicle.

If it is detected that an object is located in the surroundings of the vehicle, it is ascertained whether the vehicle is approaching the object. To do this, subsequent measurements are carried out, and in case of a decrease in the distance between the vehicle and the object, an approach of the vehicle to the object is taking place.

If the vehicle is approaching the object up to a critical distance which preferably is dimensioned so that a reaction by the driver, so as to avoid a collision with the object, is still possible, the driver is warned by the warning jerk. The critical distance of the vehicle from the object, in this context, is a function of the reaction time of the driver and the speed of the vehicle and the braking path yielded from the latter. The path covered during the reaction time is also a function of the speed of the vehicle, in this context. It is especially preferred if the warning jerk is performed at a distance from the object which corresponds to the calculated stopping path of the vehicle, which is determined from the path covered during the reaction time of the driver and the braking path of the vehicle.

The warning jerk by which the driver is warned may be implemented, for instance, by a change in the acceleration of the vehicle. Thus, it is possible, for example, to produce the warning jerk by briefly braking the vehicle and subsequently slightly accelerating it again. Alternatively, it is also possible to implement the warning jerk such that the vehicle is first accelerated and then braked. It is preferred to brake the vehicle for producing the warning jerk, and then to increase the speed slightly again, or, alternatively, to brake the vehicle and thereafter to move it at constant speed, before a reduction in speed then takes place. It is also possible first to brake the vehicle strongly and then to lower the speed of the vehicle using a slight braking action. This also produces a warning jerk.

Besides producing a warning jerk by changing the acceleration of the vehicle, it is also possible, for instance, to arrange the driver's seat such that only the driver's seat experiences a jerk. This, too, has the effect that the dangerous situation is pointed out to the driver. One additional advantage is that the passengers do not gain any knowledge of the warning to the driver.

It is preferred, however, to undertake a change in the acceleration of the vehicle to perform the warning jerk.

In order to avoid that the speed of the vehicle is further reduced when there no longer exists the danger of a collision with an object, the object continues to be detected, after the performance of the warning jerk and during the reduction in the speed of the vehicle, and the further approach to the object is followed up. After the performance of the warning jerk and during the reduction in the speed, if the vehicle continues to approach the object, the speed is further reduced. If, however, the object that the vehicle is approaching should itself move, and after the warning jerk the distance from the object should remain the same or even increase, the reduction in the speed of the vehicle is ended, and the vehicle can then continue to travel at constant speed. It is also possible, in this connection, to pass control of the longitudinal guidance of the vehicle back to the driver again, so that the responsibility of the vehicle guidance is again totally with the driver. The continued following of the object after the performance of the warning jerk particularly has the advantage that no unnecessary emergency braking process is initiated after the object is detected.

In order to give the driver the possibility of still intervening in events after the performance of the warning jerk, and possibly to initiate an avoidance maneuver or to start a braking process himself, the warning jerk is performed at a time, as was described above, at which the distance from the object is still so great that the driver is able to bring the vehicle to a standstill before a collision with the object. In this context, the distance should be selected so that the driver is able to recognize the danger situation. Too great a distance only leads to the driver's ignoring the warning jerk, and to letting himself be diverted from guiding the vehicle even after the warning jerk, since there is no endangerment from his view.

In example embodiments of the method, an emergency braking process is carried out when the driver does not react to the warning jerk. It is particularly advantageous, in this context, if the emergency braking process is only carried out if the vehicle continues to approach the object, and thus a collision with the object is threatening. The carrying out of the emergency braking process prevents a collision with the object. In this manner, both damage to the object and damage to the vehicle are prevented.

Objects that are detected by the sensors of the vehicle and which the vehicle is able to approach, may be any objects that may appear in road traffic. The objects may be both unmoving and moving objects. Unmoving objects are, for instance, barriers, walls, plant vats or plants or even parked vehicles. Moving objects are traveling vehicles or persons, such as pedestrians. Animals are also moving objects.

In order not to carry out the emergency braking process too early, the emergency braking process is carried out only when the distance from the vehicle to the object is dimensioned so that the stopping path, coming about from the reaction time of the driver and the braking path of the vehicle, would lead to a collision with the object, and the braking path of the emergency braking process would still lead to a collision-free stopping of the vehicle. In particular, when the object is a moving object, and is moving towards to vehicle, the characteristic speed of the object has to be taken into account in the calculation of the braking path that is required for the emergency braking process. Consequently, it is of advantage to calculate the stopping path, that comes about from the reaction time of the driver and the braking path of the vehicle, not from the characteristic speed of the vehicle but from the relative speed with respect to the object. In this case, it is also taken into account that an emergency braking process, in the case of an object moving in the same direction as the vehicle, has to be initiated only much later than in the case of a standing object or one that is coming towards the vehicle. The relative speed, in this context, is determined in each case from the difference of the speeds of the object and the vehicle in the travel direction of the vehicle.

Since the emergency braking process does not take place directly after the warning jerk, but rather, after the warning jerk, first the speed is reduced, in order to give the driver the possibility to react himself to the warning jerk, for instance, by initiating an avoidance maneuver or by beginning himself to brake the vehicle, it is advantageous to output a further warning to the driver directly before the emergency braking process. Because of the additional warning, the driver is then able to get set for the emergency braking process. Without the carrying out of the additional warning, the emergency braking process would set in abruptly for the driver, and he would possibly not yet expect the emergency braking process at the time then present.

The additional warning, output to the driver before the emergency braking process, may be an optical, acoustical or haptic warning. It is preferred if the additional warning, that is output to the driver before the initiation of the emergency braking process, is an additional warning jerk. In particular, it is advantageous if the additional warning jerk is a braking jerk. Moreover, it is advantageous if the additional warning jerk is more forceful than the first warning jerk that points out to the driver a possible collision with an object.

Because of the execution of the emergency braking process, only when the distance from the vehicle to the object is dimensioned so that the stopping path, coming about from the reaction time of the driver and the braking path of the vehicle, would lead to a collision with the object, the latest possible point in time is selected that would still be sufficient for an emergency braking process, and would not lead to a collision with the object. Also, the emergency braking process is only initiated at a time at which any reaction by the driver would be too late, and would lead to a collision with the object. Consequently, the emergency braking process only represents the very last manner in which a collision with the object is able to be avoided. For this reason it is also necessary for the emergency braking process to be initiated as long as the braking path of the emergency braking process still leads to a collision-free stopping of the vehicle. Particularly when the object is a human being or an animal, injury by collision with the vehicle can be avoided in this manner.

In particular, when the method is being used for driving maneuvers at low speeds, such as parking processes or driving maneuvers on narrow roads, is it advantageous if the warning to the driver is output only at speeds below 30 km/h. It is particularly advantageous to output the warning to the driver only at speeds below 15 km/h.

The speed up to which a warning is output to the driver is also a function, for instance, of the sensors being used, which are used for recording the surroundings. Thus the speed is selected, for example, so that the recording range of the sensors is at least as great as the distance from the object concerning which the warning jerk is being triggered. It is preferred that the recording range of the sensors be greater than the maximum distance from an object concerning which the warning jerk is being triggered. In particular, in sensors that have only a low recording range, such as ultrasonic sensors, the recording range of the sensors is thus limiting for the speed up to which a warning is able to be output to the driver.

Besides detecting the distance of the vehicle from the object, it is furthermore also advantageous to detect the height of the object. Thus, it is possible, for example, that the distance sensor detects an object that has a height, however, that makes driving over it free from danger. For example, the object may be the edge of a curb. If driving over an object without danger because of its height is possible, preferably no warning is output to the driver, nor is an emergency braking process initiated. However, this will preferably only occur if the speed of the vehicle is such that driving over the object having a low height does not lead to damage to the vehicle, for instance, to the underbody.

In order to detect the height of the object, any suitable sensors may be used by which the height of an object is able to be detected. Sensors, suitable for detecting the height of an object, are, for instance, cameras, radar sensors, LIDAR sensors, laser scanners, infrared sensors or ultrasonic sensors. Particularly preferred of these are cameras.

In order to detect the distance and the height of the object, the same sensors may be used, or different ones. In particular, by using different sensor types, such as ultrasonic sensors and video, and merging the data produced, it is possible to determine the distance and the height of the object at the same time, using the sensors. If different sensors are used to detect the distance from an object and the height of the object, it is especially preferred to use running time-measuring sensors to detect the distance of the object, for instance, radar sensors or ultrasonic sensors, and using cameras, for instance, to detect the height of the object.

It is also possible to use different sensors of the respectively same sensor type to detect the distance and the height.

A device, for carrying out the abovementioned method, includes sensors for recording the surroundings of the vehicle, as well as a control unit, using which data recorded by the sensors are able to be evaluated for the detection of objects. Furthermore, device(s) are included for evaluating whether the vehicle is approaching the object, as well as device(s) for actuating the brakes of the vehicle, in order to generate a warning jerk and to reduce the speed of the vehicle.

In dependence on the use of the method, the control unit is for the evaluation of the data recorded by the sensors and for the evaluation as to whether the vehicle is approaching an object, for instance, a control unit of an automatic parking system. Using it, one is able to detect objects, for instance, when the vehicle is maneuvering slowly, parks, for instance, or is moved on narrow streets or dirt roads. If the method is also to be used at higher speeds, it is possible, for example, that the control unit, for evaluating data recorded by the sensors and for evaluating whether the vehicle is approaching an object, is a control unit of a distance warning system or an ACC (adaptive cruise control).

The data for the approach of the vehicle to an object, recorded by the control unit of the automatic parking system or the control unit of the automatic cruise control are transmitted to the device for actuating the brakes of the vehicle, so that one is able to trigger a warning jerk in time, when approaching an object. As the device for actuating the brakes of the vehicle, a control unit of an electronic stability program (ESP) is used, for example.

It is possible to determine the correct time for triggering the warning jerk by the control unit of the automatic parking system, the automatic cruise control or the distance warning system, or alternatively to transmit to the control unit of the electronic stability program the data for the approach of the vehicle to an object, and to carry out the evaluation as to at what time the warning jerk is to take place and perhaps at what time the emergency braking process is to take place, by the control unit of the electronic stability program.

If a warning jerk becomes necessary, data are sent by the control unit of the electronic stability program to the respective brakes of the vehicle, which trigger and thus brake the vehicle. To trigger the warning jerk, in this context, a strong breaking is carried out, whereas the brakes are operated only lightly, in order subsequently to reduce the speed of the vehicle.

What is claimed is:

1. A method for assisting a driver of a motor vehicle in a driving maneuver, comprising:
   recording, by at least one sensor, surroundings of the vehicle;
   identifying, by a hardware control unit and based on the recorded surroundings, an object located in the surroundings of the vehicle;
   ascertaining, by the control unit, whether the vehicle is approaching the object;
   calculating, by the control unit, a distance based on a first path estimated to be covered during a driver reaction time and a second path in which the vehicle can be manually braked after the reaction time;
   outputting a warning to the driver when the vehicle approaches the distance from the object, the warning including a warning jerk; and
   after the warning jerk has taken place, automatically reducing the speed of the vehicle;
   wherein the warning jerk includes one of:
   (i) a deceleration of the vehicle in which the speed of the vehicle is reduced, and subsequent positive acceleration of the vehicle in which the speed of the vehicle is increased; and (ii) positive acceleration of the vehicle in which the speed of the vehicle is increased and subsequent deceleration of the vehicle in which the speed of the vehicle is reduced.

2. The method according to claim 1, further comprising: further recording the object after the outputting of the warning jerk; and if the vehicle does not further approach the object, ending the reduction in the speed.

3. The method according to claim 1, wherein the warning jerk is performed at a time at which a distance from the object is still so great that the driver is able to bring the vehicle to a standstill before there is a collision with the object.

4. The method according to claim 1, further comprising performing an emergency braking process if the driver does not react to the warning jerk.

5. The method according to claim 4, wherein the emergency braking process is performed only when the distance from the vehicle to the object is dimensioned so that a stopping path that is based on the braking reaction time of the driver and the braking path distance of the vehicle would result in a collision with the object, and the braking path of the emergency braking process still results in a collision-free stopping of the vehicle.

6. The method according to claim 4, further comprising outputting an additional warning to the driver before the emergency braking process.

7. The method according to claim 6, wherein the additional warning includes a braking jerk that is stronger than the warning jerk.

8. The method according to claim 1, wherein the warning jerk, in response to a braking maneuver that has already been initiated by the driver, is output later than in the case of maintaining or increasing of speed of the vehicle by the driver.

9. The method according to claim 1, wherein the warning to the driver is output only at speeds below 30 km/h.

10. The method according to claim 1, wherein a height of the object is detected and the warning to the driver is output only if driving over the object is not possible, without damaging the vehicle, because of the height.

11. A device, comprising:
sensors adapted to record surroundings of a vehicle; and
a control unit adapted to:
  evaluate data for detecting an object recorded by the sensors;
  evaluate whether the vehicle is approaching the object;
  calculate a distance based on a first path estimated to be covered during a driver reaction time and a second path in which the vehicle can be manually braked after the reaction time; and
  based on the calculation:
    actuate brakes of the vehicle to generate a warning jerk when the vehicle approaches the distance from the object; and
    reduce the speed of the vehicle;
  wherein the warning jerk includes one of:
    (i) a deceleration of the vehicle in which the speed of the vehicle is reduced, and subsequent positive acceleration of the vehicle in which the speed of the vehicle is increased; and
    (ii) positive acceleration of the vehicle in which the speed of the vehicle is increased and subsequent deceleration of the vehicle in which the speed of the vehicle is reduced.

12. The method according to claim 1, further comprising carrying out an automatic emergency braking process conditional upon that:
  (a) a latest possible point in time at which the automatic emergency braking process is able to prevent the vehicle from colliding with the object is determined to have been reached; and
  (b) the distance between the vehicle and the object is less than the distance that is based on the first and second paths.

13. The method according to claim 1, further comprising:
identifying, based on the recorded surroundings, a height of the object;
identifying a speed of the vehicle; and
determining, as a function of the vehicle speed and the object height, whether the vehicle is able to drive over the object at the identified speed without damaging the vehicle;
wherein the warning is output conditional upon that the vehicle is determined to not be able to drive over the object at the identified speed without damaging the vehicle.

14. The method according to claim 1, wherein the warning jerk includes the deceleration of the vehicle and subsequent acceleration of the vehicle.

15. The method according to claim 1, wherein the warning jerk includes the acceleration of the vehicle and subsequent deceleration of the vehicle.

16. The device according to claim 11, wherein at least a part of the control unit is arranged as a control unit of an automatic parking system.

17. The device according to claim 11, wherein at least a part of the control unit, which part controls the actuation of the brakes and reduction of the speed, includes a control unit of an electronic stability program.

18. The device according to claim 11, wherein the speed reduction is performed automatically and after the warning jerk has taken place, and the warning jerk and the speed reduction are performed by the actuation unit in response to an evaluation that the vehicle is approaching the minimum driver initiated stopping distance from the object.

19. A device adapted to perform a method for assisting a driver of a motor vehicle in a driving maneuver, the method including: recording surroundings of the vehicle; identifying, based on the recorded surroundings, an object located in the surroundings of the vehicle; ascertaining whether the vehicle is approaching the object; calculating a distance based on a first path estimated to be covered during a driver reaction time and a second path in which the vehicle can be manually braked after the reaction time; outputting a warning to the driver when the vehicle approaches the distance from the object, the warning including a warning jerk; and, after the warning jerk has taken place, automatically reducing the speed of the vehicle, the device comprising:
sensors adapted to perform the recording; and
a control unit adapted to perform the identifying, calculating, outputting, and speed reducing steps;
wherein the warning jerk includes one of:
  (i) a deceleration of the vehicle in which the speed of the vehicle is reduced, and subsequent positive acceleration of the vehicle in which the speed of the vehicle is increased; and
  (ii) positive acceleration of the vehicle in which the speed of the vehicle is increased and subsequent deceleration of the vehicle in which the speed of the vehicle is reduced.

* * * * *